Aug. 25, 1925.
L. OFFERDAHL
JOINT
Filed July 24, 1922
1,551,323
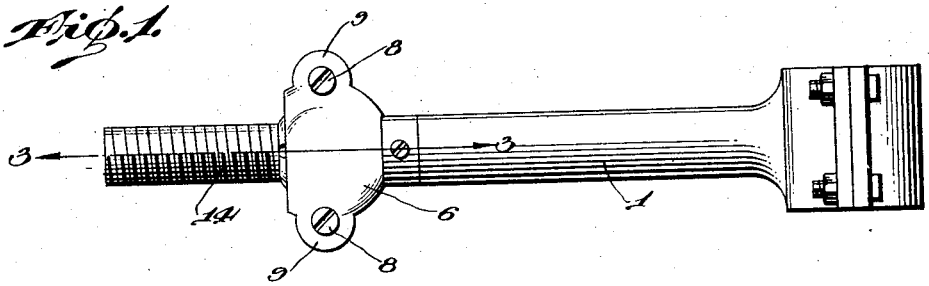
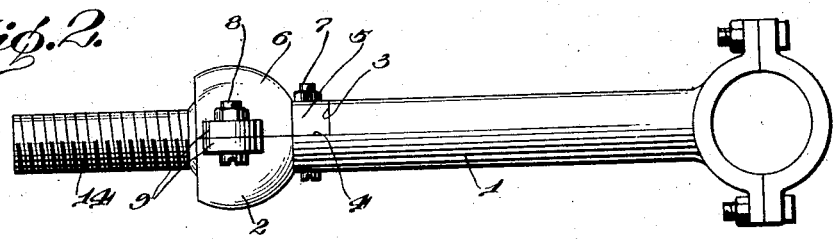
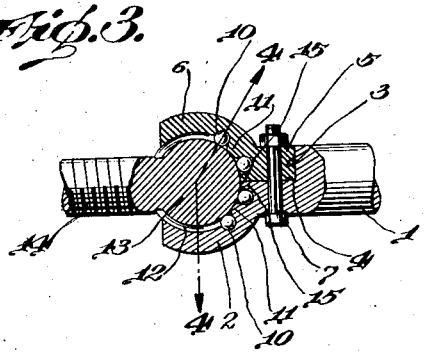
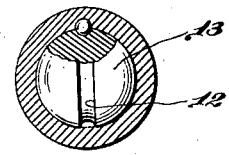
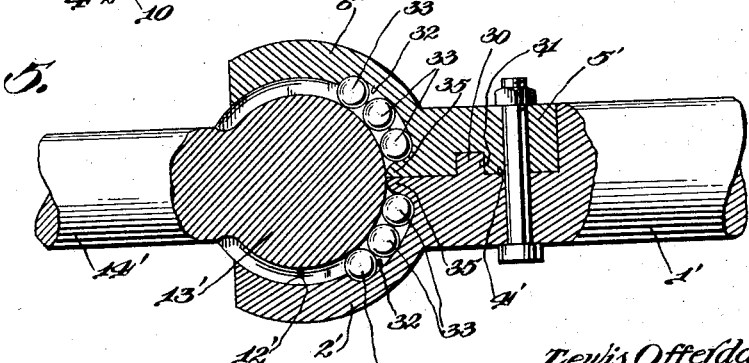
Lewis Offerdahl
INVENTOR
BY Victor J. Evans
ATTORNEY Patented Aug. 25, 1925.

1,551,323

UNITED STATES PATENT OFFICE.

LEWIS OFFERDAHL, OF CHICAGO, ILLINOIS.

JOINT.

Application filed July 24, 1922. Serial No. 577,175.

*To all whom it may concern:*

Be it known that I, LEWIS OFFERDAHL, a citizen of the United States, residing at Chicago, in the county of Cook and State of Illinois, have invented new and useful Improvements in Joints, of which the following is a specification.

This invention relates to joints and more particularly to ball and socket joints, and an object of the invention is to provide a novel type of ball and socket joint particularly designed for use in the construction of connecting rods in internal combustion engines, or for analogous structures.

More specifically, the invention comprehends the provision of a ball and socket joint in which antifriction bearing balls are utilized for decreasing friction which might be occasioned by the relative movements of the parts of the joint.

Other objects of the invention will appear in the following detailed description taken in connection with the accompanying drawings wherein:

Fig. 1 is a side elevation of the improved joint.

Fig. 2 is a plan of the joint.

Fig. 3 is a section taken on the line 3—3 of Fig. 1.

Fig. 4 is a cross section taken on the line 4—4 of Fig. 3.

Fig. 5 is an enlarged fragmentary section through a modified form of the joint.

Referring more particularly to the drawings, the improved joint is shown as embodied in the connecting rod such as used in internal combustion engine constructions, however, it is to be understood that the improved joint may be utilized in any mechanism or connection where it is found practical, without departing from the spirit of this invention.

The improved joint comprises the socket carrying rod 1 which has a semisocket 2 formed integrally therewith and which is cut away to provide a transverse shoulder 3 and longitudinally extending shoulder 4 against which the end and inner side of the attaching portion 5 of the socket section 6 abuts. The socket section 6 is connected to the rod 1 by means of a suitable bolt 7 which extends through the attaching portion 5 of the socket 6 and through the rod 1. The socket section 6 is connected to the socket section 2 by means of bolts 8 which extend through abutting ears 9. The socket sections 2 and 6 are provided with bearing ball receiving recesses 10 in their inner surfaces adjacent their innermost portions, as clearly shown in Fig. 3 of the drawings and these recesses 10 are separated one from the other by substantially semispherical projections 11 formed on the inner walls of the socket sections providing rounded stationary surfaces and spherical movable surfaces for engagement in the ball race 12 formed in the ball 13 which fits within the socket formed by the sections 2 and 6, and is carried by the rod 14. By particular reference to Fig. 4 of the drawings it will be noted that the ball race 12 extends about the ball 13 parallel to the longitudinal axis of the rod 14 and thus a ball and socket joint is provided which will permit free substantially frictionless relative movements of the rods 1 and 14 in the plane of the ball race 12 which will prevent relative movement of the rods transversely of the plane of the ball race.

In Fig. 5 of the drawings, a slight modification of the ball and socket joint is shown in which the rod 1' has an outstanding lug 30 formed on its flat shoulder 4', which lug seats in a recess 31 formed in the attaching portion 5' of the socket section 6'.

The socket sections 2' and 6' are provided with recesses or cut out portions 32 in their inner surfaces which are adapted to receive a plurality of bearing balls 33. The bearing balls 33 in the respective recesses or cut out portions 32 engage one another and they engage in the ball race 12' formed in the ball 13' carried by the rod 14'.

The differences between the modified form shown in Fig. 5 and the preferred form shown in the other figures is that the semispherical projections 11 which separate the balls 10 one from another are eliminated and bearing balls are substituted therefor. However, it will be noted that the socket sections 2' and 6' each have a projection 35 formed thereon at their sections or points of engagement, which when in abutting engagement form a substantially semispherical projection which extends into the ball race 12'. This same structure is provided in the preferred form by the lugs or projections 15 formed on the socket sections 2 and 6.

It is, of course, to be understood that the invention may be constructed in other manners and the parts associated in different relations and, therefore, I do not desire to be limited in any manner except as set forth in the claims hereunto appended.

Having thus described my invention what I claim is:

1. In a device as set forth, the combination of a socket carrying rod having a socket section formed thereon, a second socket section detachably connected to said rod and said first named socket section, a ball carrying rod, a ball thereon and seated in the socket formed by said socket sections, said ball provided with a ball race extending parallel to the longitudinal axis of the ball carrying rod, and bearing balls carried by said socket sections and engaging in said ball race, said socket sections having projections thereon at their innermost engaging portions, said projections lying in abutting engagement one with the other and forming a substantially semispherical projection which extends into said ball race.

2. In a device as set forth, the combination of a socket carrying rod having a socket section formed thereon, a second socket section detachably connected to said rod and said first named socket section, a ball carrying rod, a ball formed thereon and seated in the socket formed by said socket sections, said ball provided with a ball race extending parallel to the longitudinal axis of the ball carrying rod, bearing balls carried by said socket sections and engaging in said ball race, said socket sections having projections thereon at their innermost engaging portions, said projections lying in abutting engagement one with the other and forming a substantially semispherical projection which extends into said ball race, and substantially semispherical projections formed within said socket sections and separating said bearing balls one from the one next thereto, said projections extending into said ball race.

3. In a device as set forth, the combination of a socket carrying rod having a socket section formed thereon, a second socket section detachably connected to said rod and said first named socket section, a ball carrying rod, a ball formed thereon and seated in the socket formed by said socket sections, said ball provided with a ball race extending parallel to the longitudinal axis of the ball carrying rod, bearing balls carried by said socket sections and engaging in said ball race, and substantially semispherical projections formed upon the inner surfaces of said socket sections, and maintaining said bearing balls in spaced relation, said projections extending into said ball race.

4. A joint structure comprising a socket carrying rod having a socket on one end thereof, a ball carrying rod, a ball thereon and seated in said socket, said ball provided with a continuous ball race and bearing balls carried by said socket and engaging in said ball race to permit relative movements of said rods in one plane and to prevent relative movement of the rods transversely to said plane, a substantially semispherical projection formed in said socket at its innermost portion and engaging in said ball race.

In testimony whereof I affix my signature.

LEWIS OFFERDAHL.